Patented June 14, 1949

2,472,911

UNITED STATES PATENT OFFICE

2,472,911

QUINONEIMINE DYES FROM HYDROXYBENZAMIDOBENZALDEHYDE AND HYDROXYBENZSULFAMIDO - BENZALDEHYDE ACETALS OF LOWER ALKANOLS AND 1,2- AND 1,3-ALKANEDIOLS

Elmore Louis Martin, Wilmington, Del., assignor to E. I. du Pont de Nemours & Company, Wilmington, Del., a corporation of Delaware No Drawing. Application April 9, 1948, Serial No. 20,100

5 Claims. (Cl. 260—338)

This invention relates to new organic chemical compounds and more particularly to such compounds which have the properties of dyes. Still more particularly it relates to novel quinoneimine dyes.

An object of this invention is to provide a new class of organic compounds which have tinctorial properties. Another object is to provide a new class of quinoneimine dyes. A further object is to provide a new class of dyes from hydroxybenzamidobenzaldehyde lower glycol acetals and hydroxybenzsulfonamido benzaldehyde lower glycol acetals. A further object is to provide such compounds which have general utility in the textile and related arts. Still other objects will be apparent from the following description of the invention.

The quinoneimine dyes of this invention have one of the following formulae:

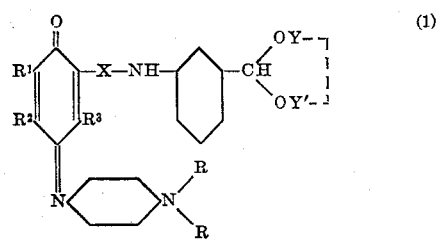

(1)

and

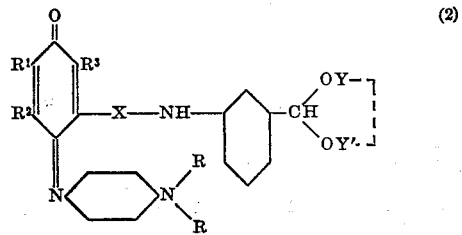

(2)

wherein R is an alkyl radical of 1 to 4 carbon atoms; $R^1$, $R^2$, and $R^3$ are hydrogen, halogen, or short-chain hydrocarbon radicals of 1 to 4 carbons; X is $SO_2$ or CO; Y and Y' are separately the alkyl portion of an alkoxy group of 1 to 4 carbons and together may be joined to form a divalent saturated aliphatic hydrocarbon radical of 2 to 4 carbon atoms, wherein 2 to 3 atoms only are in the chain between the two oxygen atoms.

The preferred compounds have the formula:

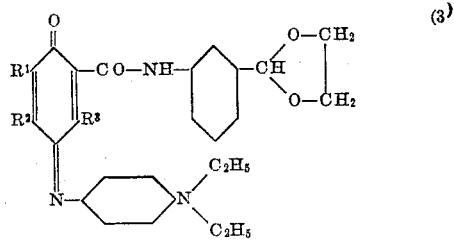

(3)

wherein $R^1$, $R^2$, and $R^3$ have the same values as above.

These dyestuffs can be prepared by reacting a lower acetal, e. g., an ethylene glycol acetal of an unsubstituted or a halogen or hydrocarbon-substituted o-hydroxybenzamidobenzaldehyde or an unsubstituted or a halogen or hydrocarbon-substituted o - hydroxybenzene - sulfonamidobenzaldehyde, with a p-aminodialkylaniline, e. g., p-aminodiethylaniline, in the presence of a mild oxidizing agent under alkaline conditions, e. g., exposed light-sensitive silver halide, or potassium ferricyanide.

The o - hydroxybenzamidobenzaldehyde and the o-hydroxybenzenesulfonamidobenzaldehyde ethylene glycol, etc., acetals can be prepared by reacting an o-hydroxy-benzoyl chloride or an o-hydroxybenzenesulfonyl chloride with m-aminobenzaldehyde acetal, e. g., the ethylene glycol acetal.

The acetals of the compounds of Formulae 1 and 2 included in the present invention are those of alkanols of 1 to 4 carbon atoms, e. g., methanol, ethanol, n-propanol, isopropanol, n-butanol and isobutanol; and alkanediols of 2 to 4 carbon atoms, e. g., ethylene glycol, 1,3-propylene glycol, 1,2-propylene glycol and 1,3-butylene glycol. The acetal nucleus of such compounds may be represented by the formulae:

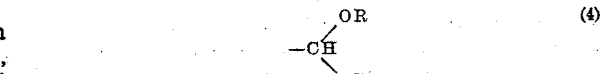

(4)

and

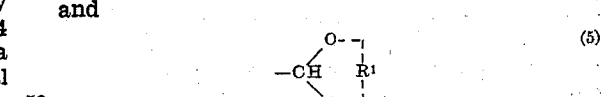

(5)

where R is an alkyl radical of 1 to 4 carbon atoms which corresponds to the above alcohols and $R^1$ is an alkylene radical of 2 to 4 carbon atoms which corresponds to the above alkanediols. The free bond is, of course, attached to the amidobenzene nucleus of the compounds illustrated in Formulae 1 and 2. The hemi-acetals are not comprehended or covered by the above formulae.

The above compounds can readily be prepared from the corresponding monohydroxybenzoic acids by converting them to the corresponding acid chlorides by reaction with thionyl chloride, phosphorous trichloride, phosphorous oxychloride, or phosphorous pentachloride, or mixtures thereof. In preparing these acid halides, it is advantageous to add to the reaction mixture from 0.1 to 1% by weight of pyridine based on the halogenating agent, e. g., thionyl chloride. Before this conversion is effected, the hydroxy group may be protected by acylation by various types of acylating agents, such as acetyl chloride, acetic anhydride, ethyl chlorocarbonate, benzoyl chloride, p-toluene sulfonyl chloride, etc.

The monohydroxybenzoic acid chloride is then condensed with m-aminobenzaldehyde or a substitution product thereof or a simple acetal or such aldehydes, e. g., a dimethyl, diethyl, or ethylene glycol acetal. The reaction is carried out in a liquid medium in the presence of a basic agent capable of removing hydrogen chloride formed. Suitable acid neutralization agents that can be used include alkali metal carbonates, bicarbonates and hydroxides, organic tertiary bases such as pyridine, piperidine, triethylamine, etc. Useful liquid media include dioxane, water, water-dioxane mixtures, ether, acetone, dimethyl formamide, etc. In place of carboxylic acid chlorides, there may be used carboxylic acid halides other than the chlorides, e. g., the corresponding bromides, but the chlorides are of most practical use.

The acetals described in the preceding two paragraphs constitute the invention of application Serial Number 13,523, filed March 6, 1948.

The m-aminobenzaldehyde acetals used as starting materials may be prepared in any suitable fashion; for example, by the method described in J. Chem. Soc., 121, 76 (1922). However, the preferred method of preparing m-aminobenzaldehyde acetals involves the acetalization of m-nitrobenzaldehyde followed by catalytic reduction with hydrogen.

The invention is further illustrated by the following examples in which parts are by weight.

*Example I*

This example describes the preparation of a quinoneimine dye from m-(3-methylsalicylamido)benzaldehyde ethylene glycol acetal.

A solution of 37.4 parts of silver nitrate in 300 parts of water is added slowly to a well-stirred solution containing 14.6 parts of sodium chloride and 0.3 part of gelatin in 200 parts of water. To the suspension of finely divided silver chloride is added successively a solution of 20 parts of sodium carbonate monohydrate in 100 parts of water and a solution of 7.5 parts of m-(3-methylsalicylamido)benzaldehyde ethylene glycol acetal, disclosed in Example VI of Serial Number 13,523, dissolved in 100 parts of 95% alcohol. Finally a solution of 5.5 parts of p-aminodiethylaniline hydrochloride in 200 parts of water is added dropwise with vigorous agitation. The dye is formed immediately and agitation is continued for 30 minutes after the last addition. The mixture of dye, silver, and silver chloride is collected on a filter and dried. The dried mixture is extracted with methylene chloride and the extract concentrated to 50 parts and 50 parts of anhydrous ether added. Further addition of 50 parts of petroleum ether results in separation of crystals of the blue-green dye. After about 4 hours, the solution is filtered and 8.08 parts of dark yellowish green crystals collected which melt sharply at 132–133° C. This dye has the formula:

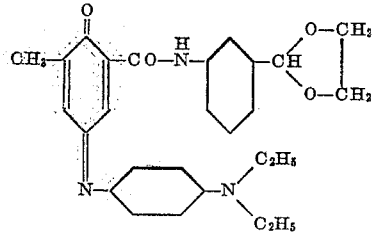

*Example II*

Using the same procedure as described in Example I, a blue-green dye is prepared from m-(2-hydroxy-benzamido)benzaldehyde ethylene glycol acetal. From 7.5 parts of the acetal are obtained 11.5 parts of dye, melting sharply at 133–134° C. This dye has the formula:

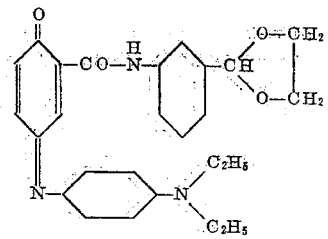

Other o-hydroxybenzamidobenzaldehyde and o-hydroxybenzenesulfonamidobenzaldehyde ethylene glycol acetals which can be used to form the dyes of the invention include compounds wherein the $R^1$, $R^2$, and $R^3$ may, individually or separately, be methyl, ethyl, propyl, butyl, and allyl, which compounds are described in application Serial Number 13,523.

Other color developers which can react with the o-hydroxybenzamidobenzaldehydes and the o-hydroxybenzenesulfonamidobenzaldehyde acetals includes various N-, and N,N-substituted p-phenylenediamines such as p-amino-dimethylaniline, p-aminodipropylaniline, and p-amino-dibutylaniline and various p-aminophenols such as 2,6-diiodo-4-aminophenol.

The acetals as indicated above and in the application referred to may be ethylene glycol acetals, as illustrated in the examples. They may further be acetals of methyl, ethyl, propyl, or butyl alcohol, or they may be acetals of 1,2-propylene glycol, 1,3-propylene glycol, and 1,3-butylene glycol.

Ethylene glycol acetals of the following aldehydes can be converted into blue-green dyes in accordance with the process of the examples: m-(3 - allylsalicylamido)benzaldehyde, m - (3-isoproyl-6 - methylsalicylamido)benzaldehyde, m - (4 - methylsalicylamido)benzaldehyde, m - (3-methylsalicylamido)benzaldehyde, m - (3,6 - dimethylsalicylamido)benzaldehyde, m - (6 - chloro-3-methylsalicylamido)benzaldehyde, m - (4-chloro-3-methylsalicylamido)benzaldehyde, m - (3-hyroxy-4-methylbenzamido)benzaldehyde, m-(2-hydroxybenzamido)benzaldehyde, m-(2-hydroxy benzene sulfonamido)benzaldehyde, m-(3- methyl-2-hydroxybenzenesulfonamido)benzaldehyde.

The dyes of this invention are useful as textile colors. They may be applied to cotton, wool, silk or nylon by first reducing with sodium hydrosulfite and mild alkali to a soluble form and applying to the desired fabric followed by reoxidation in air or with sodium dichromate or sodium perborate to give very bright blue to green shades. Further, the dyes have the important property of exceptionally good wet fastness on these fabrics.

This is illustrated by coloration of nylon fabric with the dye of Example I. Two parts of dye is dispersed in 50 parts of water containing 1.2 parts of sodium hydroxide and 20 parts of 10% sodium dodecyl sulfate solution. Four parts of sodium hydrosulfite is stirred in and the mixture is heated to 80–90° C. Eight parts additional of sodium hydrosulfite is added in two portions at 20-minute intervals and then 50 parts of water is added. A yellow solution is obtained which is filtered. To the filtrate is added 2 parts of knit nylon fabric and heating at 80–90° C. is continued for one hour. The nylon is then removed and placed in 100 parts of 0.5% aqueous potassium bichromate. A deep blue-green color forms immediately on the nylon fabric, which is characterized by specially good wash fastness.

Although the vat process involving reduction is the preferred method of applying these dyes to textile fibers to achieve good penetration of color, they can also be applied directly, i. e., without prior reduction. This method is particularly applicable to the utilization of these dyes as throwster colors.

As many widely different embodiments of this invention can be made without departing from the spirit and scope thereof, it is to be understood that the invention is not to be limited except as defined by the claims.

What is claimed is:

1. The quinoneimine compounds taken from the group consisting of compounds of the formula:

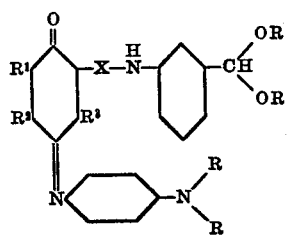

and

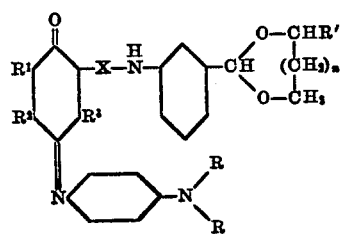

where R is an alkyl radical of 1 to 4 carbon atoms, $R^1$ is a member taken from the group consisting of hydrogen, alkyl of 1 to 4 carbon atoms and allyl, $R^2$ is a member taken from the group consisting of hydrogen and alkyl radicals of 1 to 4 carbon atoms, $R^3$ is a member taken from the group consisting of hydrogen and chlorine, R' is taken from the group consisting of hydrogen and methyl, $n$ is a number taken from the group consisting of 0 and 1, and X is a member taken from the group consisting of $—SO_2—$ and $—CO—$.

2. The quinoneimine compounds of the formula:

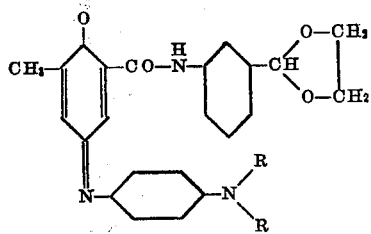

wherein R is an alkyl radical of 1 to 4 carbon atoms.

3. The compound of the formula:

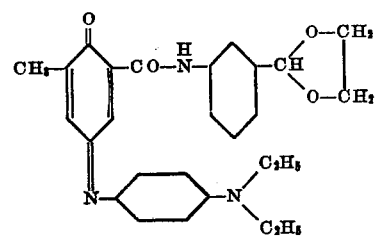

4. The quinoneimine compounds of the formula:

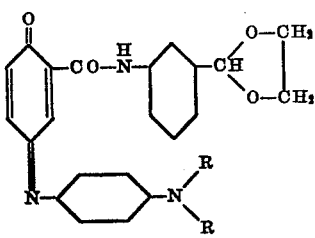

wherein R is an alkyl radical of 1 to 4 carbon atoms.

5. The compound of the formula:

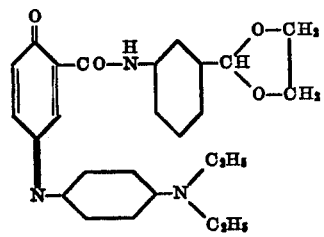

ELMORE LOUIS MARTIN.

No references cited.